(12) United States Patent
Jensen et al.

(10) Patent No.: US 9,994,168 B1
(45) Date of Patent: Jun. 12, 2018

(54) ACTIVE DENT SHIELD FOR VEHICLE DOOR

(71) Applicant: FORD GLOBAL TECHNOLOGIES, LLC, Dearborn, MI (US)

(72) Inventors: John W. Jensen, Canton, MI (US); Mahmoud Yousef Ghannam, Canton, MI (US); Howard E. Churchwell, II, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/440,717

(22) Filed: Feb. 23, 2017

(51) Int. Cl.
*B60R 3/02* (2006.01)
*B60R 13/04* (2006.01)
*B60R 3/00* (2006.01)

(52) U.S. Cl.
CPC .............. *B60R 13/04* (2013.01); *B60R 3/002* (2013.01); *B60R 3/02* (2013.01)

(58) Field of Classification Search
CPC ............ B60R 3/02; B60R 3/002; B60R 19/42
See application file for complete search history.

(56) References Cited

U.S. PATENT DOCUMENTS

| | | |
|---|---|---|
| 3,718,357 A | 2/1973 | Hertzell |
| 4,217,715 A | 8/1980 | Bryan, Jr. |
| 5,131,703 A | 7/1992 | Stirling |
| 5,358,268 A | 10/1994 | Hawkins |
| 5,601,300 A | 2/1997 | Fink et al. |
| 6,536,790 B1 | 3/2003 | Ojanen |
| 6,955,370 B2 | 10/2005 | Fabiano et al. |
| 7,077,440 B1 | 7/2006 | Morales et al. |
| 7,287,771 B2 | 10/2007 | Lee et al. |
| 7,318,596 B2 | 1/2008 | Scheuring, III et al. |
| 7,354,083 B1 | 4/2008 | Obermann |
| 7,377,531 B2 * | 5/2008 | Fabiano .................. B60R 3/002 182/88 |
| 8,146,935 B1 | 4/2012 | Adams |
| 8,235,432 B2 * | 8/2012 | Ryan ....................... B60R 19/38 280/163 |
| 8,262,113 B1 | 9/2012 | Chafey et al. |
| 8,590,951 B1 | 11/2013 | Calabro |
| 9,180,824 B1 | 11/2015 | Rodriguez et al. |

(Continued)

FOREIGN PATENT DOCUMENTS

| | | |
|---|---|---|
| CN | 102555963 A | 7/2012 |
| EP | 1445151 A1 | 8/2004 |

(Continued)

OTHER PUBLICATIONS

English Machine Translation of JP4647805B2.

(Continued)

*Primary Examiner* — Bryan A Evans
(74) *Attorney, Agent, or Firm* — Jason Rogers; King & Schickli, PLLC

(57) ABSTRACT

A dent shield for a vehicle door includes a running board having a first position for stepping into the vehicle door. The running board conceals or at least partially overlies a lifter including a linkage in the lowered position. The lifter includes an actuator for actuating the linkage to move the running board to a second position (which may be a tilted position) for at least partially shielding the vehicle door from dents or dings.

15 Claims, 4 Drawing Sheets

(56) References Cited

U.S. PATENT DOCUMENTS

| | | | |
|---|---|---|---|
| 9,308,880 | B1 | 4/2016 | Johnson |
| 2003/0006575 | A1 | 1/2003 | Genis et al. |
| 2004/0108678 | A1 | 6/2004 | Berkebile et al. |
| 2006/0175791 | A1 | 8/2006 | Kaempe |
| 2007/0228748 | A1 | 10/2007 | Ryan et al. |
| 2008/0252034 | A1 | 10/2008 | Duncan |
| 2009/0184485 | A1 | 7/2009 | Castillo et al. |
| 2010/0194070 | A1* | 8/2010 | Stauffer ............... B60R 3/002 280/166 |
| 2015/0291116 | A1 | 10/2015 | Pi |
| 2017/0190308 | A1 | 7/2017 | Smith et al. |

FOREIGN PATENT DOCUMENTS

| | | |
|---|---|---|
| GB | 2535991 A | 9/2016 |
| JP | 4647805 B2 | 3/2011 |
| KR | 100976996 B1 | 8/2010 |
| WO | 200253416 A2 | 7/2002 |

OTHER PUBLICATIONS

314 Engineering Co. Ltd.; "Automatic Car Door Protection at the Touch of a Button"; https://www.crowdfunder.com/autoblocksystem; printed on Nov. 2, 2016; pp. 1-3.
English machine translation of CN102555963A.
English machine translation of KR100976996B1.
Non-Final Office Action dated Jul. 31, 2017 for U.S. Appl. No. 15/335,630, filed Oct. 27, 2016.
Final Office Action dated Feb. 5, 2018 for U.S. Appl. No. 15/335,630, filed Oct. 27, 2016.

* cited by examiner

ACTIVE DENT SHIELD FOR VEHICLE DOOR

TECHNICAL FIELD

This document relates generally to the motor vehicle field and, more particularly, to an active dent shield for protecting a vehicle and, in particular, a vehicle door, from being dented.

BACKGROUND

Modern vehicle styling has removed typical dent protection, such as rubber bumpers, from the vehicle doors. Consequently, door dents and dings have increased in frequency, with the cost of the repair being shouldered solely by the vehicle operator. This not only increases the cost of vehicle ownership, but also the associated frustration level. Moreover, it is a problem incapable of redress by the vehicle owner without altering the appearance of the vehicle.

For instance, an example of a past proposal for a vehicle step that offers dent protection, but at the expense of aesthetics, is shown in U.S. Pat. No. 8,146,935. This arrangement is limited pragmatically because the mechanism for actuation is fully exposed to view, and thus presents an unattractive appearance that would be unacceptable to most vehicle owners (which are well known to be conscious of the appearance of their vehicle). Because the running board is also rotated into the protective position, it must be spaced a significant distance from the rocker, or else it will potentially engage and damage the vehicle on actuation (including if inadvertently is overextended). The step is also not in the form of a conventional running board, and thus could not be used with existing vehicle designs without significant modification.

Accordingly, a need is identified for a new and improved active dent shield for a motor vehicle.

SUMMARY

In accordance with the purposes and benefits described herein, a dent shield for a vehicle door includes a running board having a first position for stepping into the vehicle door. A linkage is connected to the running board. An actuator is provided for actuating the linkage to move the running board to a second position for at least partially shielding the vehicle door. Thus, the linkage in concealed in the first (lowered) position of the running board, such that the outward appearance of the vehicle is largely unaffected despite the improvement afforded.

In one embodiment, the linkage comprises a first link positioned below the running board in the first position and connected to the actuator. A second link forming part of the linkage may be pivotally connected to the first link, and also may be positioned below the running board in the first position. A third link pivotally connected to the second link may also be positioned below the running board in the first position. In such an arrangement, movement of the first link in an outboard direction causes the running board to tilt for assuming the second position.

In another arrangement, a fourth link is pivotally connected to the first link, and a fifth link is pivotally connected to the second or third link and the fourth link. The linkage may in such case comprise a parallelogram linkage, with the second link and the fourth link being generally parallel, and the first link and the fifth link being generally parallel. Movement of the first link in an outboard direction thus erects the linkage and causes the running board to raise the second position without tilting.

According to a further aspect of the disclosure, a dent shield for a vehicle door is provided. The dent shield may include a running board having a generally horizontal position for stepping into the vehicle door. A linkage may be connected to the running board. An actuator for actuating the linkage moves the running board from the horizontal to a tilted (e.g., not fully vertical) position for at least partially shielding the vehicle door.

In one embodiment, the linkage includes a first link connected to the actuator and adapted for moving away from the vehicle, and a second link pivotally connected to the first link for moving the running board to the tilted position. The linkage may further include a third link pivotally connected to the first link for raising the second link in response to movement of the first link by the actuator. The titled position of the running board orients the plane of the upper surface thereof so that it is less than 90 degrees from a vertical direction.

In accordance with a further aspect of the disclosure, a dent shield for a vehicle door is provided. The dent shield includes a running board having a lowered position for stepping into the vehicle door. An actuator is also provided, along with a linkage at least partially underlying the running board in the lowered position.

In one embodiment, the linkage comprises a first link positioned below the running board in the first position and pivotally connected to the actuator. The linkage may comprise a second link pivotally connected to the first link, the second link positioned below the running board in the first position. A third link pivotally connected to the second link is also positioned below the running board in the first position. The third link may be anchored at one end and pivotally connected to the second link at the other, such that movement of the first link in an outboard direction causes the running board to tilt for assuming the second position.

In another embodiment, a fourth link is pivotally connected to the first link, and a fifth link is pivotally connected to the second or third link and the fourth link. The second link and the fourth link may be generally parallel, and the first link and the fifth link may be generally parallel.

In the following description, there are shown and described several preferred embodiments of the active dent shield. As it should be realized, the active dent shield is capable of other, different embodiments and the several details are capable of modification in various, obvious aspects all without departing from the active dent shield as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the active dent shield and, together with the description, serve to explain certain principles thereof. In the drawing figures.

Reference will now be made in detail to the present preferred embodiments of the active dent shield, examples of which are illustrated in the accompanying drawing figures.

DETAILED DESCRIPTION

Figure 1:
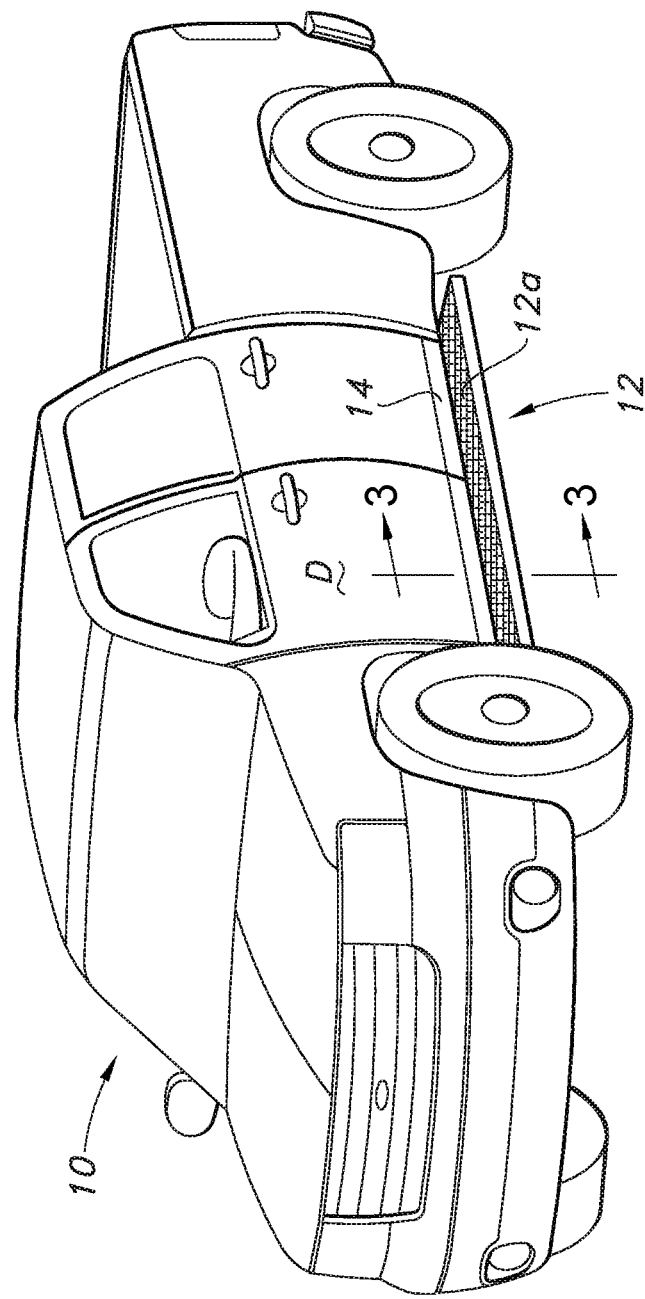
FIG. 1 is a perspective view of a motor vehicle including a running board.

Reference is now made to FIG. 1, which illustrates a vehicle 10 (such as a pick-up truck, as just an example) that includes a running board 12 for extending from a rocker 14. As can be understood from FIG. 2, a running board 12 is typically positioned on both the left and right sides of the vehicle 10 to provide assistance for the ingress and egress of the passenger compartment through a corresponding door D (front and rear doors, as shown in FIG. 1, but also for only single door vehicles). For this reason, the running board 12 typically includes a generally planar upper surface 12a adapted to receive the vehicle operator or passenger's foot, and thus has a width that generally exceeds its height by a significant amount (e.g., 2-3 times or more).

Figure 2:
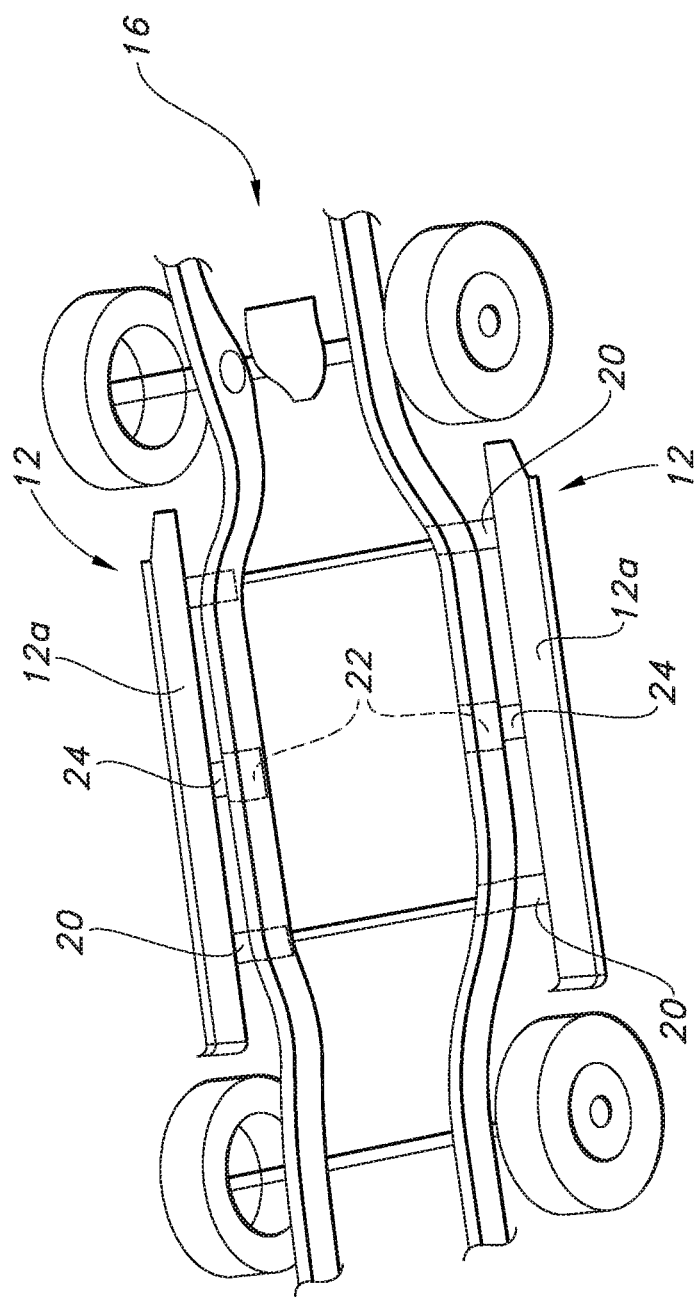
FIG. 2 is a perspective view of a vehicle chassis.

With continued reference to FIG. 2, the running board 12 may be supported by the frame 16 of the vehicle 10, which may include suitable cross members 18 for providing strength and stability. The support for the running board 12 along each side of the vehicle 10 may be provided by a pair of generally planar supports 20. The supports 20 may comprise cantilevered arms extending outwardly from the frame 16 and rocker 14 to present the running board 12 at a position for facilitating stepping into the vehicle 10.

Figure 3:
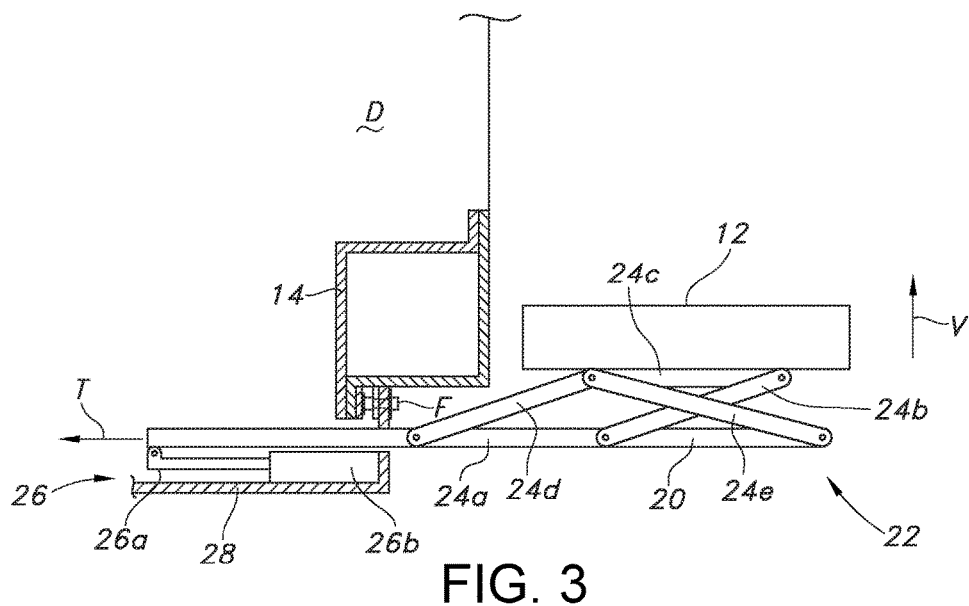
FIG. 3 is a partially cross-sectional, partially cutaway side view illustrating one embodiment of a dent shield in a retracted position.

With reference to FIG. 3, which is a partially cross-sectional view taken along line 3-3 of FIG. 1, it can be understood that the running board 12 may be adapted for being moved from a retracted position, such as a lowered position supported by the supports 20 for use in stepping into the vehicle 10, to a deployed or raised position (and possibly tilted, as noted below). In the raised position, the running board 12 forms a dent "shield" and thus providing a measure of protection for the adjacent vehicle door D (or a corresponding pillar, such as the A-, B-, or C-pillar). This movement may be facilitated by a lifter 22, which comprises a linkage 24 for moving the running board 12 as a result of actuation by an actuator 26, such as a linear actuator (e.g., a ball or jack screw, or perhaps a pneumatic, electric, or hydraulic cylinder). The linear actuator 26 may be supported by a bracket 28 connected to the rocker 14 by a suitable fastener F, or may be supported by the vehicle frame 16 (but the arrangement could also be secured directly to the frame or another secure mounting location on the vehicle 10).

The linkage 24 may comprise a plurality of links, such as five links 24a, 24b, 24c, 24d, 24e in the depicted example of FIG. 3. Specifically, a first link 24a may be connected to the actuator 26 and arranged for moving to and fro in a transverse (outboard) direction T relative to a direction of vehicle travel. A second link 24b connects to a distal end (relative to the vehicle 10) of the first link 24a, and is attached to a third link 24c that extends generally parallel to the first link 24a and the support 20. The third link 24c may also be attached directly to the underside of the running board 12. A fourth link 24d connects at a proximal end to the first link 24a, and a distal end to the joint formed between the third link 24c and a fifth link 24e, which has a distal end connected to the support 20 (and is thus allowed to pivot, but not translate to and fro). Suitable hinge pins may connect the links 24a-24e and the support 20 (as applicable) to permit relative rotation so that the linkage 24 may be erected and collapsed for reasons that will become evident from the following description.

Figure 3A:
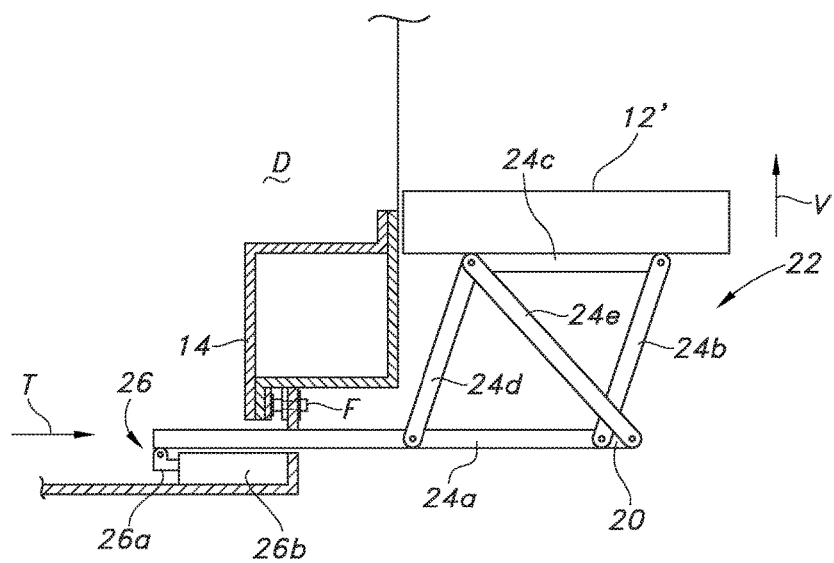
FIG. 3A is a side view similar to FIG. 3 showing the dent shield in a deployed position.

As shown in FIG. 3A, when the first link 24a is moved in the transverse direction T outboard of the vehicle 10, this causes the linkage 24 to erect and thus raise the running board 12 in a generally vertical direction V. In the erected position, a parallelogram linkage is formed, with the first and third links 24a, 24c being generally parallel (meaning as close to parallel as reasonably possible, subject to tolerances), and the second and fourth links 24b, 24d are likewise generally parallel. In such case, the relative dimensions of the links 24a-24e are such that the running board 12 is raised to a position (such as above the upper extent of the rocker 14, as indicated by position 12') for shielding the door D and possibly other parts of the vehicle (such as the rear view mirror) against contact from external objects likely to cause dents and, particularly, the opened doors of adjacent vehicles in a parking area. In this manner, the door D is protected against the incidence of accidental dings and dents from surrounding vehicles, or perhaps even wayward shopping carts, and consequently, operating costs and operator frustration may be reduced.

It can also be appreciated that, using this arrangement, the lifter 22 (e.g., linkage 24 and actuator 26) is substantially concealed from view from above, as can be understood from FIG. 1. Specifically, the running board 12 at least partially covers the linkage 24 such that the mechanism cannot be perceived by someone standing next to the vehicle 10 and looking down toward the rocker 14. Consequently, a more aesthetically pleasing arrangement results.

It can be further appreciated that the relative movement of the running board 12 as a result of the erection of the linkage 24 is exclusively in the vertical direction V, and in a linear manner, without the need for rotating the running board 12 (such that the upper surface 12a remains generally parallel to the horizontal in both the lowered and raised positions). As a result, the chance of the running board 12 accidentally crashing into the door D from overextension and itself causing damage, rather than shielding against it, is substantially minimized. Any such risk is further eliminated by arranging the actuator 26 such that the rod 26a extends the first link 24a as a result of being fully retracted into a case or housing 26b from the extended position corresponding to the lowered position of the running board 12, thus ensuring that the actuator 26 cannot possibly cause contact between the running board 12 and the door D. The distance traveled by the raising action will also in most applications be minimized to a few inches, rather than rotating the running board 12 through an entire arcuate path, as would occur with purely rotary movement, thus leading to efficiency of movement and expediency (which may be important when the deactivation is done by a remote control or key fob by a person desiring to enter the vehicle).

In a second embodiment, the lifter 32 includes a different linkage 34 that includes a first link 34a connected to the actuator 26. A second link 34b is connected at a proximal end to the distal end of the first link 34a. A third link 34c (which is behind links 34a, 34b in FIG. 4) connects the distal end of the second link 34b with a stationary structure, such as the support 20.

Figure 4:
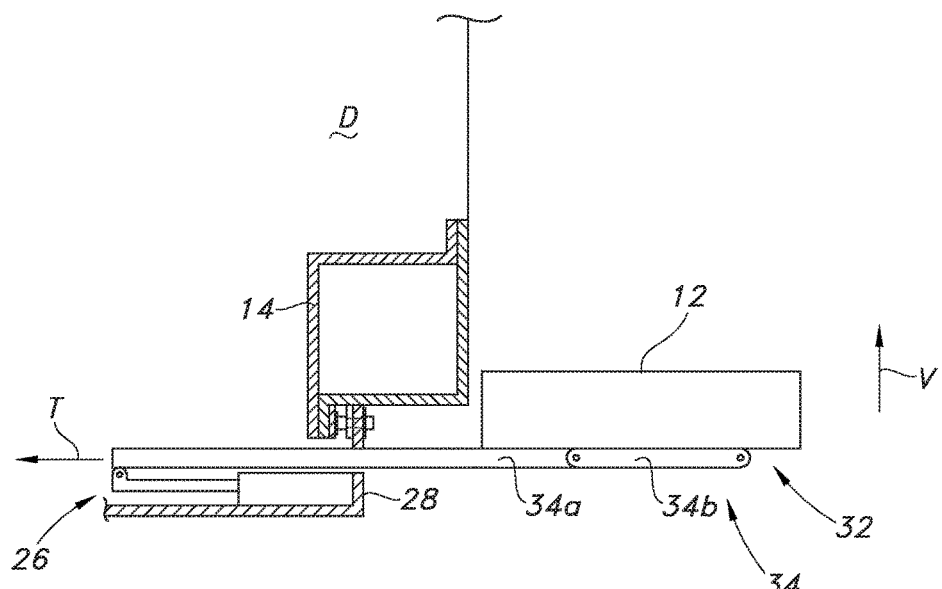
FIG. 4 is a partially cross-sectional, partially cutaway side view illustrating another embodiment of a dent shield in a retracted position.
Figure 4A:
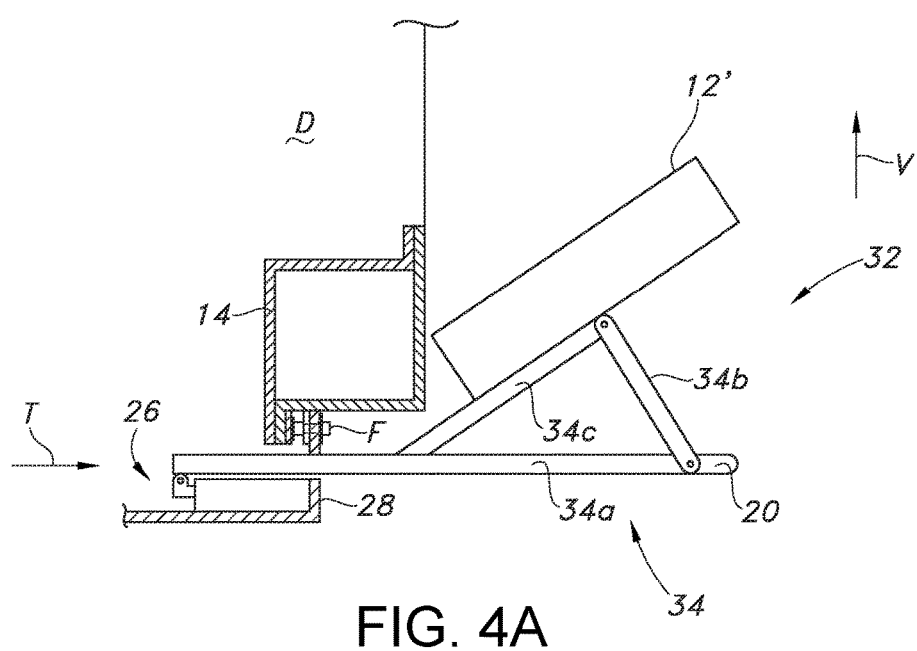
FIG. 4A is a side view similar to FIG. 4 showing the dent shield in a deployed position.

Actuation of the actuator 26 in this embodiment thus causes the second link 34b to raise to the position shown in FIG. 4a as a result of the connection with the third link 34c, which again is fixed against translation at one end. This causes the running board 12 to assume a tilted position (note position 12' in FIG. 4A, which as can be appreciated is less than 90 degrees relative to the vertical direction D, and approximately 45 degrees in the illustrated embodiment), and yet one that still affords the protection against dents and dings that might be caused by the opening doors of adjacent vehicles. In this case, the movement is at an angle to the vertical direction V, and still done in a conservative manner that precludes undesirable over-actuation and potential damage to the door D. Furthermore, the lifter 32 is substantially fully concealed from view from above, since it is almost entirely covered by the running board 12 in the first or lowered position (FIG. 4). Thus, the vehicle 10 appearance is as per the usual arrangement as shown in FIG. 1, despite the new and improved active dent shield that results.

The actuation of the dent shield via actuator 26 may be selectively done depending on an operating condition of the vehicle, and may be controlled by communication with a controller (not shown). For example, a button provided in the passenger cabin or on a remote control (e.g., key fob) may be pressed before exiting the vehicle 10 to actuate the dent shield. When the vehicle 10 detects that all doors have been closed upon existing (which may be done using suitable sensors) and/or locked, the actuator 26 may be activated after a certain elapsed time to erect the linkage 24, 34. When the door(s) are unlocked, the actuator 26 may be activated to collapse the linkage 24, 34, thus allowing for the opening of the door(s) without impediment.

Summarizing, a new and improved active dent shield may be achieved for protecting a corresponding part of a vehicle 10, such as the door D, by raising and lowering the vehicle running board 12 in a vertical direction (and without the need for rotating it into position). The lifter 22, 32 used would be substantially concealed or covered by the running board 12, thus allowing for a normal appearance when the dent shield is inactive. Activation provides the desirable benefit of shielding the vehicle door(s) from dents or dings, thus reducing the expense of ownership and associated troubles. The proposed dent shield would be easily implemented on existing running board designs without extensive modification or adjustment.

The foregoing has been presented for purposes of illustration and description. It is not intended to be exhaustive or to limit the embodiments to the precise form disclosed. For example, the particular linkages 24, 34 illustrated in the drawing figures are examples only, and are not intended to be the exclusive arrangements that may be used, and other arrangements of different numbers of links may be used to raise the running board to the dent shielding position. Obvious modifications and variations are possible in light of the above teachings. For instance, it is also possible to retract the running board 12 to a stowed position when use is not desired, and the actuation may be from the stowed position to the fully erect position for dent shielding without stopping at a position for facilitating stepping into the vehicle 10. All such modifications and variations are within the scope of the appended claims when interpreted in accordance with the breadth to which they are fairly, legally and equitably entitled.

What is claimed:

1. A dent shield for a vehicle door, comprising:
   a running board having a first position for stepping into the vehicle door;
   a linkage connected to the running board having a first link below the running board in the first position, the running board concealing the linkage in the first position; and
   an actuator for actuating the first link to move the running board to a second position for at least partially shielding the vehicle door.

2. The dent shield of claim 1, wherein the linkage comprises a second link pivotally connected to the first link, the second link positioned below the running board in the first position.

3. The dent shield of claim 2, wherein the linkage comprises a third link pivotally connected to the second link, the third link positioned below the running board in the first position.

4. The dent shield of claim 3, wherein movement of the first link in an outboard direction causes the running board to tilt for assuming the second position.

5. The dent shield of claim 3, further including:
   a fourth link pivotally connected to the first link;
   a fifth link pivotally connected to the second or third link and the fourth link.

6. The dent shield of claim 5, wherein:
   the second link and the fourth link are generally parallel; and
   the first link and the fifth link are generally parallel.

7. The dent shield of claim 5, wherein movement of the first link in an outboard direction causes the running board to raise to the second position without tilting.

8. A dent shield for a vehicle, comprising:
   a vehicle door;
   a running board having a generally horizontal position for stepping into the vehicle door;
   a linkage connected to the running board; and
   an actuator for actuating the linkage to move the running board to a tilted position at least partially above a lower edge of the vehicle door for at least partially shielding the vehicle door;
   wherein the linkage comprises:
   a first link connected to the actuator and adapted for moving in a generally horizontal direction; and
   a second link pivotally connected to the first link for moving the running board to the tilted position;
   a third link pivotally connected to the first link for raising the second link in response to movement of the first link by the actuator.

9. The dent shield of claim 8, wherein the titled position of the running board is less than 90 degrees from a vertical direction.

10. A dent shield for a vehicle door, comprising:
    a running board having a first lowered position for stepping into the vehicle door and a second position for shielding the vehicle door;
    an actuator; and
    a linkage at least partially underlying the running board in the lowered position, the linkage comprising first and second links positioned below the running board in the first position, the first link pivotally connected to the actuator and the second link.

11. The dent shield of claim 10, wherein the linkage comprises a third link pivotally connected to the second link, the third link positioned below the running board in the first position.

12. The dent shield of claim 11, wherein the third link is anchored at one end and pivotally connected to the second link at the other.

13. The dent shield of claim 10, wherein movement of the first link in an outboard direction causes the running board to tilt for assuming the second position.

14. The dent shield of claim 10, further including:
a fourth link pivotally connected to the first link;
a fifth link pivotally connected to the second or third link and the fourth link.

15. The dent shield of claim 14, wherein:
the second link and the fourth link are generally parallel; and
the first link and the fifth link are generally parallel.

\* \* \* \* \*